United States Patent [19]

Kneer

[11] Patent Number: 4,820,108

[45] Date of Patent: Apr. 11, 1989

[54] ARRANGEMENT FOR THE ESSENTIALLY UNIFORM LEVEL PLACEMENT OF BULK MATERIAL IN AN UPRIGHT CIRCULAR CYLINDRICAL VESSEL

[75] Inventor: Franz X. Kneer, Eschenburg-Eibelhausen, Fed. Rep. of Germany

[73] Assignee: Gebrüder Weiss K.G.

[21] Appl. No.: 35,476

[22] Filed: Apr. 7, 1987

[30] Foreign Application Priority Data

Apr. 8, 1986 [DE] Fed. Rep. of Germany ....... 3611785

[51] Int. Cl.$^4$ ............................................. B65G 65/30
[52] U.S. Cl. .................................... 414/301; 198/641
[58] Field of Search ............................. 414/300–302; 198/641, 638, 631; 239/681, 687, 665, 684

[56] References Cited

U.S. PATENT DOCUMENTS

| 412,303 | 10/1889 | Smith | 198/631 X |
| 855,744 | 6/1907 | Argall | 414/302 X |
| 1,521,820 | 1/1925 | Lloyd | 198/631 X |
| 2,219,954 | 10/1940 | Geiger et al. | 414/302 |
| 3,785,513 | 1/1974 | Kitzinger et al. | 198/641 X |
| 4,119,193 | 10/1978 | Smith et al. | 198/631 X |
| 4,397,423 | 8/1983 | Beaver et al. | 414/301 X |

Primary Examiner—Robert J. Spar
Assistant Examiner—David A. Bucci
Attorney, Agent, or Firm—Toren, McGeady & Associates

[57] ABSTRACT

An arrangement for the essentially uniform level placement of bulk material in an upright circular cylindrical vessel. The arrangement includes a throwing device for throwing the bulk material into the vessel. A feeding device feeds the bulk material onto the throwing device. The throwing device is rotatably mounted about a vertical axis, the rate of rotation of throwing means being controllable. The throwing device includes an essentially horizontally extending endless conveyor belt. The length of the conveyor belt is relatively short in relation to the diameter of the vessel. The conveying speed of the conveyor belt is controllable within a range from a minimum speed for throwing the bulk material into the center region of the vessel and a maximum speed for throwing the bulk material into the peripheral area of the vessel.

1 Claim, 3 Drawing Sheets

ARRANGEMENT FOR THE ESSENTIALLY UNIFORM LEVEL PLACEMENT OF BULK MATERIAL IN AN UPRIGHT CIRCULAR CYLINDRICAL VESSEL

BACKGROUND OF THE INVENTION

1. Field of the Invention

The present invention relates to an arrangement for the essentially uniform level placement of bulk material in an upright circular cylindrical vessel or tank. A throwing device for throwing the bulk material into the vessel is mounted at the top of the vessel. A feeding device is used for feeding the bulk material onto the throwing device. The throwing device is rotatably mounted about a vertical axis, the rate of rotation of the throwing means being controllable.

2. Description of the Prior Art

Arrangements of the above-described type are known, for example, from German Offenlegungsschrift No. 27 03 329. These known arrangements have been found to be useful for filling relatively homogenous bulk material into vessels having an average diameter of about 3 m. However, as soon as the vessel diameter is greater than 3 m, the rate of rotation of the throwing device would be increased in order to change the parabolic trajectories of the bulk material in such a way that the entire diameter range of the vessel is covered by the bulk material. Of the circular ring disks used in these arrangements, the lowermost disks then no longer drop the bulk material in a parabolic path, but they throw the bulk material against the wall of the vessel, so that the bulk material fills up the vessel in the form of a heap which is downwardly inclined toward the center of the vessel. Thus, a uniform level placement of the bulk material in the vessel is no longer possible.

In addition, in the known arrangements, the long parabolic trajectories of the bulk material result in an undesirable separation of the bulk material. This is of a particular disadvantage if the vessel is a so-called aeration reactor for the controlled decomposition of organic wastes which include a uniform admixture of wood cuttings or sawdust as carbon carriers. Due to the separation and the non-uniform level of the bulk material over the cross-sectional area of the vessel, a uniform decomposition of the organic waste is no longer possible. As is well known, such a decomposition can only take place if the aeration reactor has been uniformly filled and the bulk material remains a uniform mixture during filling. Finally, an already partially filled aeration reactor must continue to be filled in a uniform manner because otherwise an uneven decomposition process would take place.

It is, therefore, the primary object of the present invention to provide an improved arrangement of the aforementioned type for a uniform level placement of bulk material in a cylindrical vessel.

It is particularly an object of the present invention to provide an arrangement for the uniform level placement of bulk material in an aeration reactor for the controlled decomposition of organic wastes by means of which it is possible in a simple and safe manner to fill containers having even relatively large diameters without causing a separation of the bulk material to be filled into the container.

SUMMARY OF THE INVENTION

In accordance with the present invention, the throwing device of the arrangement for the uniform level placement of bulk material in an upright circular cylindrical vessel includes an essentially horizontally extending endless conveyor belt, the length of the conveyor belt being relatively short in relation to the diameter of the vessel. In addition, the conveying speed of the conveyor belt is controllable.

The use of a relatively short conveyor belt according to the invention as the throwing device which is rotatable about the center axis of the vessel to be filled with bulk material does utilize the effect of obtaining differently long parabolic trajectories by using different throwing speeds. However, the throwing speeds are substantially slower than is the case in the known circular ring disks. In addition, the throwing width of the conveyor belt according to the invention is several times greater than the throwing widths obtained with the known circular ring disks or rotating plates. As is well known, the bulk material is dropped onto these rotating plates in the form of a point and is thrown from the rotating plates in the same form.

In accordance with another feature of the invention, the effective length of the conveyor belt is adjustable relative to the radius of the vessel. Thus, contrary to the known rotating disks which are fixed relative to the center of the vessel, the location from which the bulk material is thrown is adjustable in the arrangement according to the invention. As a result, together with the controllable conveying or throwing speed, the controllable rate of rotation of the throwing device and the adjustment of the throwing location, the arrangement according to the invention makes it possible in a simple and safe manner uniformly to fill vessels having very large diameters without causing a separation of bulk material which is introduced in the form of a mixture.

The throwing device of the arrangement according to the invention deposits the bulk material in the form of concentric, annular heaps. In addition, the throwing device is unable to fill the area of the vessel near the axis of rotation of the throwing device. However, the bulk material slides by itself toward the center of the vessel. Moreover, in the center of a vessel constructed as an aeration reactor are provided delivery or discharge units. Therefore, the quality of bulk material deposited in the center of the vessel is smaller than in the annular portions of the vessel adjacent the center.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
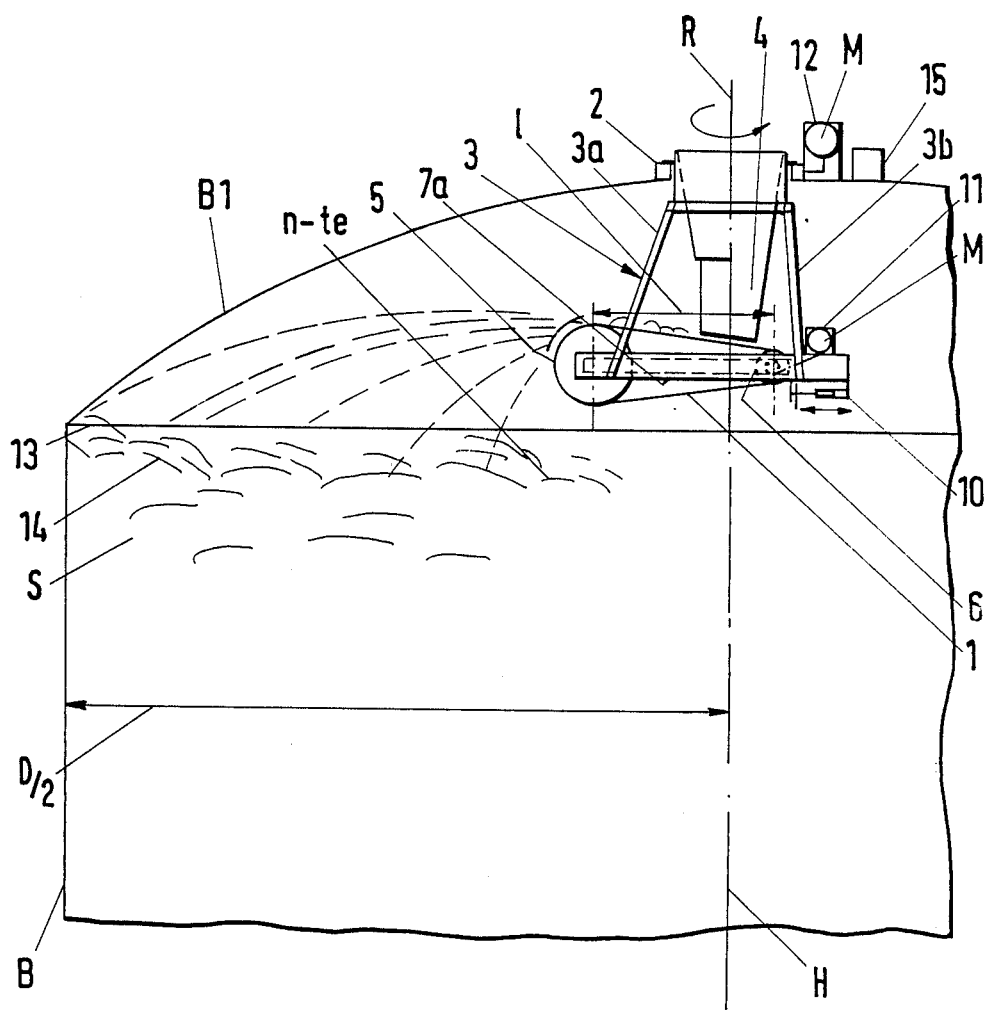
FIG. 1 is a cross-sectional view of an arrangement according to the invention for distributing bulk material within a vessel, the vessel being illustrated partly in section.
Figure 2:
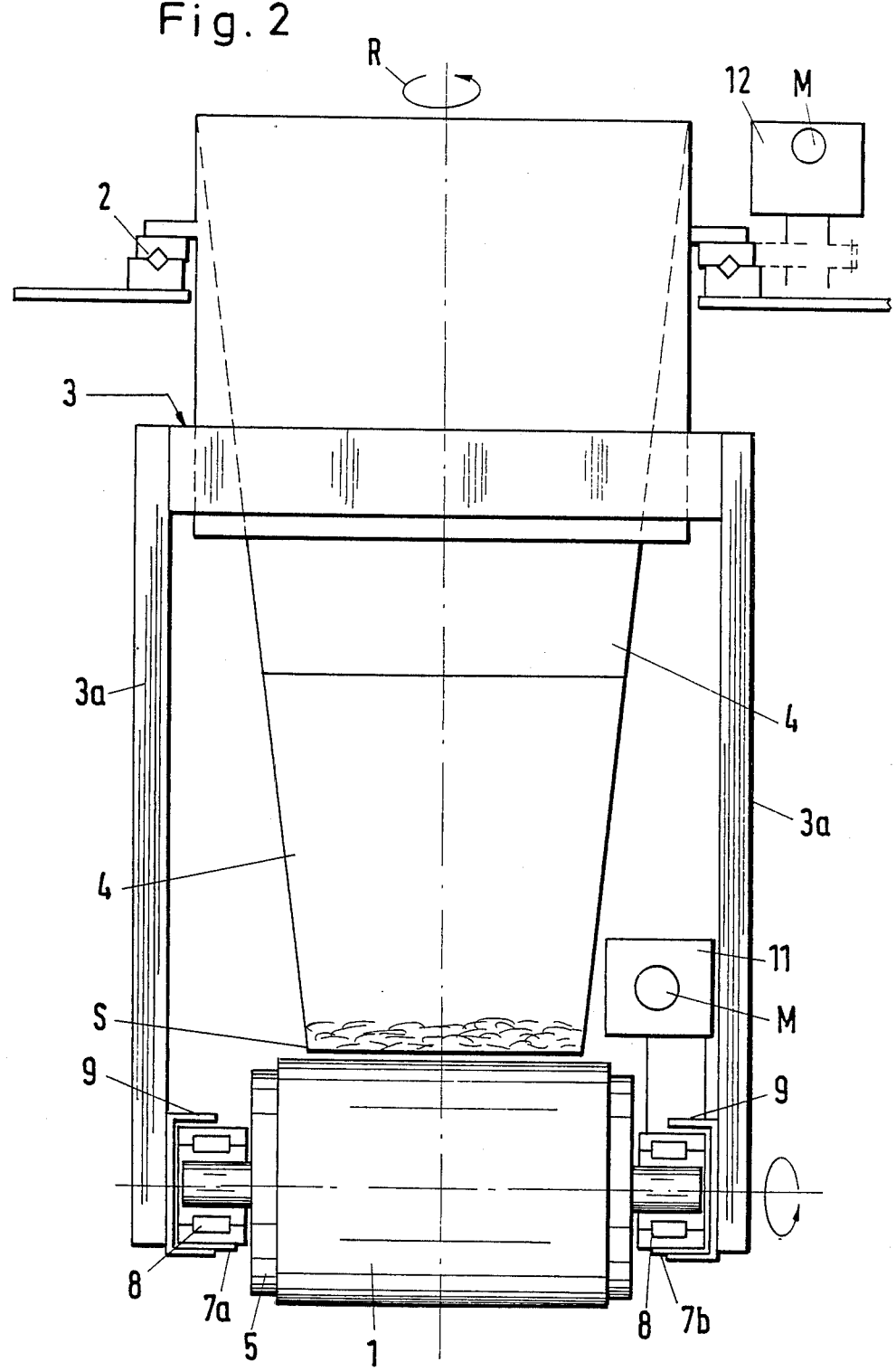
FIG. 2 is an elevational front view, on a larger scale, of the arrangement of FIG. 1.
Figure 3:
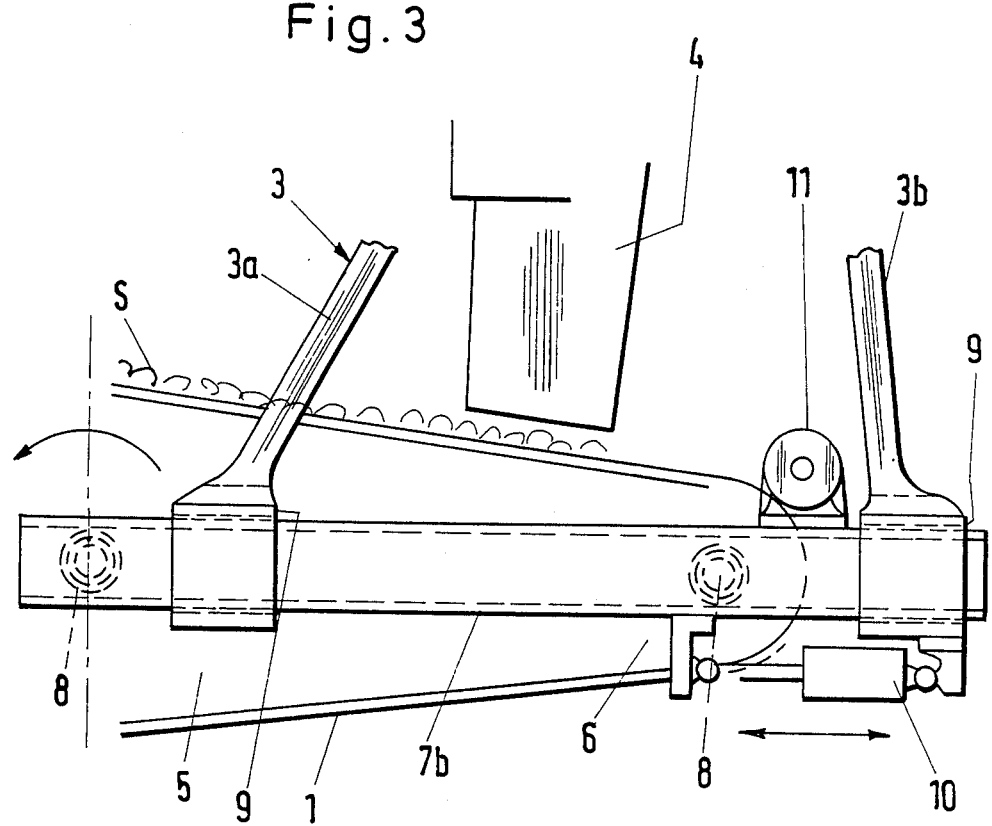
FIG. 3 is an elevational side view, on a larger scale, of the arrangement of FIG. 1.

As illustrated in FIG. 1 of the drawing, the arrangement according to the present invention is mounted in a vessel B which is to be filled with bulk material S. The arrangement essentially includes a throwing device for the bulk material S in the form of an endless conveyor belt 1 extending approximately horizontally in radial direction relative to the vertically extending center axis H of the vessel. The arrangement further includes a rotatable support unit 3 which is rotatably mounted in a bearing 2 relative to the vessel cover B1, and a hopper 4 through which bulk material S is continuously supplied onto conveyor belt 1.

In the illustrated embodiment, the conveyor belt 1 includes a larger front guide roller 5 at the discharge end and a smaller rear guide roller 6. Both rollers 5 and 6 are rotatably supported in roller bearings 8 mounted in a conveyor belt frame which essentially is formed by two parallel connecting rods 7a and 7b. Rods 7a and 7b forming the conveyor belt frame are slidably mounted in longitudinal guide members 9 which are fixedly connected to rotary support unit 3 by means of fork-like support members 3a and 3b. A known hydraulic cylinder 10 is used to effect the radially directed longitudinal adjustment of the conveyor belt 7a, 7b in the direction of the double arrow 1 shown in FIG. 1.

A suitable motor 11 with gear assembly is used to drive the conveyor belt 1 or its rear guide roller 6. The rotating motion about vertical axis H in direction of arrow R of the support unit 3 with hopper 4 and conveyor belt frames 7a, 7b is effected by means of motor 12. The diameter of vessel B is denoted with reference character D and the length of conveyor belt 1 is denoted with reference character 1. Preferably, the length 1 of conveyor belt 1 is slightly shorter than a quarter of the vessel diameter D.

When the above-described arrangement according to the invention is used for organic wastes, the motors used are preferably hydraulic motors. In addition, a schematically illustrated control device 15 is provided which is used to control the sequence of operation described below.

The arrangement according to the present invention is operated as follows. It should be noted that the operation described below is the preferred mode of operation out of a number of possible different modes of operation.

During the operation of the arrangement, support unit 3 is rotated about vertical axis H of the vessel B. Support unit 3 rotates together with the conveyor belt 1 and its frame 7a, 7b and hopper 4. Metered quantities of bulk material S are continuously supplied through hopper 4 onto conveyor belt 1. After each rotation, the speed of the conveyor belt 1 is changed. In order to obtain an always uniform level filling of bulk material in the vessel, i.e., to obtain a heap of material which is formed by a plurality of level layers, the speed of the conveyor belt is changed in accordance with the following sequence, the sequence being described beginning with the moment when during a given rotation of the conveyor belt about vertical axis H the throwing speed of the conveyor belt 1 is at a maximum. In other words, the bulk material is thrown at this moment to the periphery of the interior of the vessel and an approximately annular heap of material 13 is formed.

During the next rotation of conveyor belt 1 about the vertical axis H, the speed of the conveyor belt 1 is reduced in such a way that the thrown bulk material S forms a second annular heap of material 14 which is located radially adjacent and inwardly of the outermost heap of material 13. The nth annular heap of material in the same plane of distribution is the innermost heap of material obtained when the lowest speed of the conveyor belt has been reached.

Subsequently, the change of the speed of the conveyor belt is reversed, i.e., in the next higher level of distribution, the speed of the conveyor belt is increased from rotation to rotation from the innermost point of reversal to the outermost point of reversal. Since, after the bulk material has been introduced to form a full heap of material in the vessel and after decomposition has taken place, the material is uniformly removed from the bottom of the vessel, the individual layers of the heap of material travel from top towards the bottom. As a result, a sliding down of the layers of the material lead to a leveling of the material within each layer.

Although the invention has been described above in conjunction with a vessel into which a material to be composed is filled, the invention can also be used equally well for filling other vessels in a uniform level manner.

While a specific embodiment of the invention has been shown and described in detail to illustrate the application of the inventive principles, it will be understood that the invention may be embodied otherwise without departing from such principles.

I claim:

1. In an arrangement for the essentially uniform level of placement of bulk material in an upright circular cylindrical vessel, comprising a throwing means for throwing the bulk material into the vessel, the throwing means mounted at the top of the vessel, a feeding means for feeding the bulk material onto the throwing means, the throwing means being rotatable about a vertical axis, the rate of rotation of the throwing means being controllable, the throwing means including first and second guide rollers and an essentially horizontally extending endless conveyor belt guided on the guide rollers, a control unit for controlling the conveying speed of the conveyor belt, the length of the conveyor belt being smaller than a quarter of the diameter of the vessel, the first guide roller being located at the discharge end of the conveyor belt, the first guide roller having a greater diameter that the second guide roller at the other end of the conveyor belt, the throwing means including a conveyor belt frame for supporting the guide rollers, the conveyor belt frame mounted longitudinally movably in a radial direction in a support unit which is rotatable about the vertical axis of the vessel, and the support unit including fork-like front and rear support members slidably connected to the conveyor belt frame, a cylinder means connected between the fork-like rear member and the conveyor belt frame for moving the conveyor belt frame longitudinally, the conveying speed of the conveyor belt being adjustable by the control unit after each complete rotation of the throwing means about the vertical axis of the vessel, the range of adjusting the conveying speed of the conveyor belt ranging from a minimum speed for throwing the bulk material into the center region of the vessel and a maximum speed for throwing the bulk material into the area of the periphery of the vessel, so that the throwing means deposits the bulk material in the interior of the vessel in the form of a level heap of material.

* * * * *